(12) United States Patent
Notten et al.

(10) Patent No.: US 7,465,514 B2
(45) Date of Patent: Dec. 16, 2008

(54) ELECTROCHEMICAL ENERGY SOURCE AND ELECTRONIC DEVICE INCORPORATING SUCH AN ENERGY SOURCE

(75) Inventors: Petrus Henricus Laurentius Notten, Eindhoven (NL); Hans Feil, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/546,407

(22) PCT Filed: Feb. 17, 2004

(86) PCT No.: PCT/IB2004/050118

§ 371 (c)(1),
(2), (4) Date: Aug. 18, 2005

(87) PCT Pub. No.: WO2004/075316

PCT Pub. Date: Sep. 2, 2004

(65) Prior Publication Data

US 2006/0159976 A1    Jul. 20, 2006

(30) Foreign Application Priority Data

Feb. 24, 2003    (EP) .................................. 03075527

(51) Int. Cl.
*H01M 8/02*    (2006.01)
*H01M 4/86*    (2006.01)

(52) U.S. Cl. .......................................... 429/37; 429/40
(58) Field of Classification Search ................... 429/40, 429/41
See application file for complete search history.

(56) References Cited

U.S. PATENT DOCUMENTS

| | | | |
|---|---|---|---|
| 5,180,645 A | | 1/1993 | More |
| 5,534,362 A | * | 7/1996 | Okamoto et al. ............... 429/32 |
| 2002/0004167 A1 | | 1/2002 | Jenson et al. |
| 2002/0015877 A1 | | 2/2002 | Tao |
| 2002/0122972 A1 | * | 9/2002 | Klitsner et al. ................. 429/42 |
| 2003/0091885 A1 | * | 5/2003 | Kobayashi et al. ............. 429/32 |
| 2004/0067406 A1 | * | 4/2004 | Champion et al. ............. 429/40 |
| 2005/0255372 A1 | * | 11/2005 | Lertola ........................ 429/44 |

FOREIGN PATENT DOCUMENTS

| | | | |
|---|---|---|---|
| JP | WO 02/61869 | * | 5/2002 |
| WO | 0069007 A1 | | 11/2000 |

* cited by examiner

*Primary Examiner*—Susy Tsang-Foster
*Assistant Examiner*—Alix Echelmeyer
(74) *Attorney, Agent, or Firm*—Michael E. Belk

(57) ABSTRACT

The invention relates to an electrochemical energy source comprising at least one fuel cell, which fuel cell comprises: a first current collector coupled to a negative electrode, a fuel source connected to said negative electrode, a second current collector coupled to a positive electrode, an oxidant source connected to said positive electrode, and an ion-conducting electrolyte located between said negative electrode and said positive electrode. The invention also relates to an electronic device incorporating such an electrochemical energy source.

9 Claims, 2 Drawing Sheets

ELECTROCHEMICAL ENERGY SOURCE AND ELECTRONIC DEVICE INCORPORATING SUCH AN ENERGY SOURCE

The invention relates to an electrochemical energy source comprising at least one fuel cell, which fuel cell comprises: a first current collector coupled to a negative electrode, a fuel source connected to said negative electrode, a second current collector coupled to a positive electrode, an oxidant source connected to said positive electrode, and an ion-conducting electrolyte located between said negative electrode and said positive electrode. The invention also relates to an electronic device incorporating such an electrochemical energy source.

An electrochemical energy source comprising a fuel cell is known in the art. In principle, a fuel cell operates like a battery. However, unlike a battery, a fuel cell commonly neither degenerates (if fuel and oxidant are constantly added to the fuel cell) nor requires electrical recharging. A fuel cell will produce energy (substantially) in the form of electricity and heat as long as fuel and oxidant are supplied to the fuel cell. There are several advantages in the use of a fuel cell as compared with a battery. A major advantage of the fuel cell can be that the capacity is much higher than the capacity of a conventional battery. Moreover, a fuel cell is a relatively clean energy source. Primarily, depending on the nature of the fuel used, only water vapor and carbon dioxide (on using fuels containing carbon) are evolved during the electrochemical conversion process.

A conventional battery integrated in a part of a housing of an electrical appliance is disclosed in the American patent publication U.S. Pat. No. 5,180,645. An integrated battery (permanently) built into or forming part of an equipment housing has numerous advantages. An integrated battery results commonly in a smaller overall size, lighter overall weight, and lower fabrication cost of the electronic device. Besides these advantages, however, the known electrochemical energy source which is integrally formed with a part of a housing of an electronic device has several drawbacks. One of the drawbacks is the relatively restrictive degree of freedom of design since the choice of a desirable shape and/or format is extremely limited, i.e. restricted to that of flat batteries. Therefore the shape of the housing of said electronic device is commonly adapted to the shape and format of batteries suitable for that specific device.

It is an object of the present invention to provide an improved electrochemical energy source comprising at least one fuel cell, which energy source can be applied in an electronic device having an arbitrary shape and thus without incurring the described drawback while preserving the advantages of the prior art.

The object is achieved by an electrochemical source as described in the preamble and characterized in that the electrochemical energy source has a curved, planar geometry. A major advantage of the electrochemical energy source having a curved, planar geometry is that any desired shape of said electrochemical energy source can be realized so that the freedom of choice as regards shape and format of said electrochemical energy source is many times greater than the freedom offered by the state of the art. The geometry of said electrochemical energy source can thus be adapted to spatial limitations imposed by any electrical apparatus in which the battery can be used, contrary to the techniques known of the prior art. From a point of view of space, electrical apparatuses can now be more efficiently configured in many cases because of the greater freedom of choice of the geometry of the electrochemical energy source; this may lead to a saving of space in and a greater freedom of design of the apparatus. It is to be noted that the curved planar geometry results in a curved battery which has a curved planar shape which may be concave/convex or wavy. However, it also imaginable for a person skilled in the art to apply an angular energy source which has a hooked shape.

In a preferred embodiment, the electrochemical energy source comprises a lamination of said anode and said cathode, characterized in that the lamination has a curved shape such that the lamination is situated in one curved plane. Relatively thin and elongated laminations can thus be provided in an relatively simple manner.

Preferably, the electrolyte is formed by a Proton Exchange Membrane (PEM). The PEM, being a solid-state electrolyte, provides transport of protons from the negative electrode to the positive electrode. The operating temperature of the PEM is commonly up to 120° C. Depending on the application of the fuel cell, different types of electrolytes may be used. Besides PEM, for example alkaline (AFC), phosphoric acid (PAFC), molten carbonate (MCFC), and solid oxide (SOFC) may also be used as electrolytes. In another preferred embodiment, said electrolyte is a liquid-state electrolyte, in particular alkaline, phosphoric acid, and molten carbonate, retained in a matrix located between the positive electrode and the negative electrode. The matrix may also vary independence on the type of electrolyte used in the fuel cell. For alkaline usually asbestos is used as a matrix, for phosphoric acid silicon carbide may be used, and for molten carbonate a ceramic matrix of $LiAlO_2$ is commonly used.

In a preferred embodiment, the electrochemical energy source comprises at least one assembly of fuel cells electrically coupled together, wherein insulation means are provided for insulating one cell within said assembly from another cell within said assembly. Said fuel cells may be connected in parallel to increase total power output, and/or in series to increase the voltage produced by the fuel cells.

In another preferred embodiment, cooling means are provided for cooling said fuel cell. The cooling means are suited to control the heat produced by said fuel cell. Said cooling means may be formed, for example, by a plate, a flexible material layer, or tubes commonly containing cooling liquid.

Preferably, the electrochemical energy source comprises at least one battery electrically coupled to said fuel cell. Integration of fuel cells with batteries or supercapacitors leads to so-called hybrid systems or hybrid energy sources. A first advantage of said hybrid system is that a high-load performance can be achieved. In situations where a relatively high power output has to be generated, both the battery and the fuel cell may be brought into action. Another advantage of the hybrid system is that the system can be started up easily at relatively low temperatures by bringing the battery into action. Unlike a battery, a fuel cell per se commonly functions relatively tardily at low temperatures.

The positive electrode and the negative electrode are preferably provided with a catalyst for accelerating electrochemical reaction in said fuel cell. The type of electrocatalyst commonly depends on the type of electrolyte used. In case of a PEM or a PAFC, platinum is mostly used as electrocatalyst. In an AFC a wide range of electrocatalysts may be used, for example nickel, silver, metal oxides, spinels, noble metals, and mixtures of these.

In a preferred embodiment, said fuel cell is stacked by a polymer deposited in cavities formed in the positive electrode, the negative electrode and the electrolyte. In this way the fuel cells are formed by the so-called "Lithylene" technology. This "Lithylene" technology is described in more detail in the American patent publication U.S. Pat. No. 6,432, 576. In this technology, the active material layers themselves are not embedded in a polymer, but the polymer is used exclusively for binding material layers together. Binding the positive electrode and the negative electrode is commonly important in fuel cells, as the operation temperature of the fuel cell can vary over a wide range, thereby expanding and shrinking components of the fuel cell significantly. Solid electrical contact must be maintained between all components within the fuel cells at every temperature. Polymeric riveting of all layers of the fuel cell can cause this solid contact to be maintained between catalyst layers and the electrolyte. The viscosity of the polymer must be sufficient low to allow good filling of empty spaces within the fuel cell in such a way that leakage of the fuel is prevented. The "Lithylene" technology is particularly advantageous with assemblies ("stacks") of fuel cells as the assembly can obtain a relatively good mechanical strength by riveting of the components of said assembly. The polymeric material is shaped so as to fit the shapes of the respective holes (cavities), thereby sticking the positive electrode, negative electrode, and electrolyte together. The shape of said assembly can be maintained in a relatively easy and simple way through riveting of said assembly. It is important to retain a good supply of fuel and oxidant to the respective electrodes, despite the fact that the components are riveted by polymer.

The invention also relates to an electronic device incorporating such an electrochemical energy source. Preferably the electronic device comprises a housing incorporating said electrochemical energy source. Advantages of the application of a electrochemical energy source with a planar, curved geometry in said housing of an electrical device have already been described above.

The invention will be described in detail hereinafter with reference to the non-limitative embodiments that are shown in the Figures.

Figure 1:
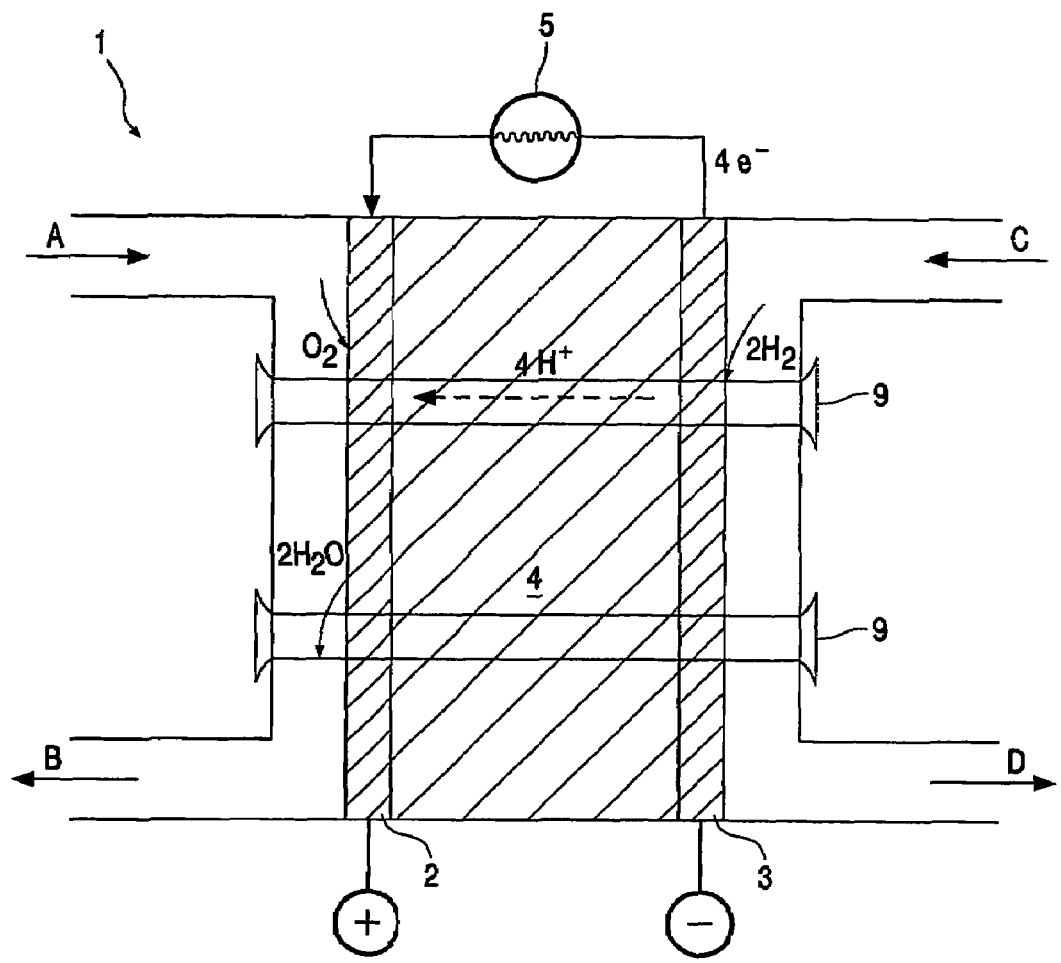
FIG. 1 is a schematic view of the working principle of a fuel cell.

FIG. 1 is a schematic view of the working principle of a fuel cell 1. The fuel cell 1 comprises a positive electrode 2, a negative electrode 3, and a solid-state electrolyte 4 positioned between the positive electrode 2 and the negative electrode 3. In this particular embodiment the (solid-state) electrolyte 4 is formed by a Proton Exchange Membrane (PEM), which provides transport of protons from the negative electrode 3 to the positive electrode 2. The positive electrode 2 is connected to an oxidant source A and an excess oxidant and reaction product outlet B, whilst the negative electrode 3 is connected to a fuel source C and an excess fuel outlet D. In this particular embodiment (gaseous) hydrogen is used as the fuel and (atmospheric) oxygen is used as the oxidant. The positive electrode 2 and the negative electrode 3 are electrically connected to an electronic device 5. During use, the hydrogen will react on the negative electrode 3 thereby creating protons and electrons. The protons will be conducted via the PEM to the positive electrode 2 while the electrons will be transported via the electronic device 5 to said positive electrode 2. On the positive electrode 2 the oxygen will react with the received protons and electrons, thereby forming water as a reaction product. The excesses or unused fractions of hydrogen and oxygen added to the fuel cell 1 may preferably be recirculated and may be re-added to the fuel cell via inlet A and inlet C, respectively. The positive electrode 2, negative electrode 3, and electrolyte 4 are stacked by polymer material 9 pierced (riveted) through these components 2, 3, 4 according to the "Lithylene" technology. In this way a mechanically stable fuel cell I can be generated.

Figure 2:
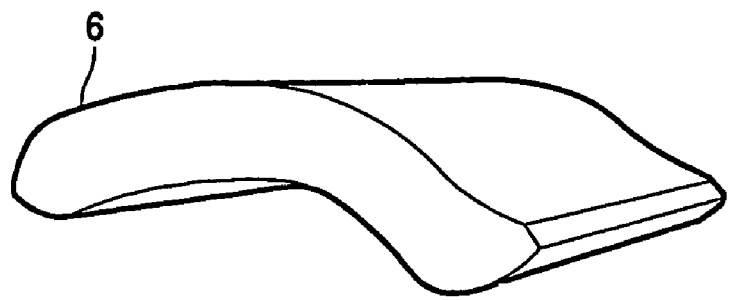
FIG. 2 is a perspective and overall view of the enclosure of an electrochemical energy source in accordance with the invention.

FIG. 2 is a perspective view of an electrochemical energy source 6 in accordance with the invention. The electrochemical energy source 6 comprises one or more, preferably laminated, fuel cells. FIG. 2 clearly shows that the electrochemical energy source 6 has an (arbitrarily chosen) curved, planar shape.

Figure 3:
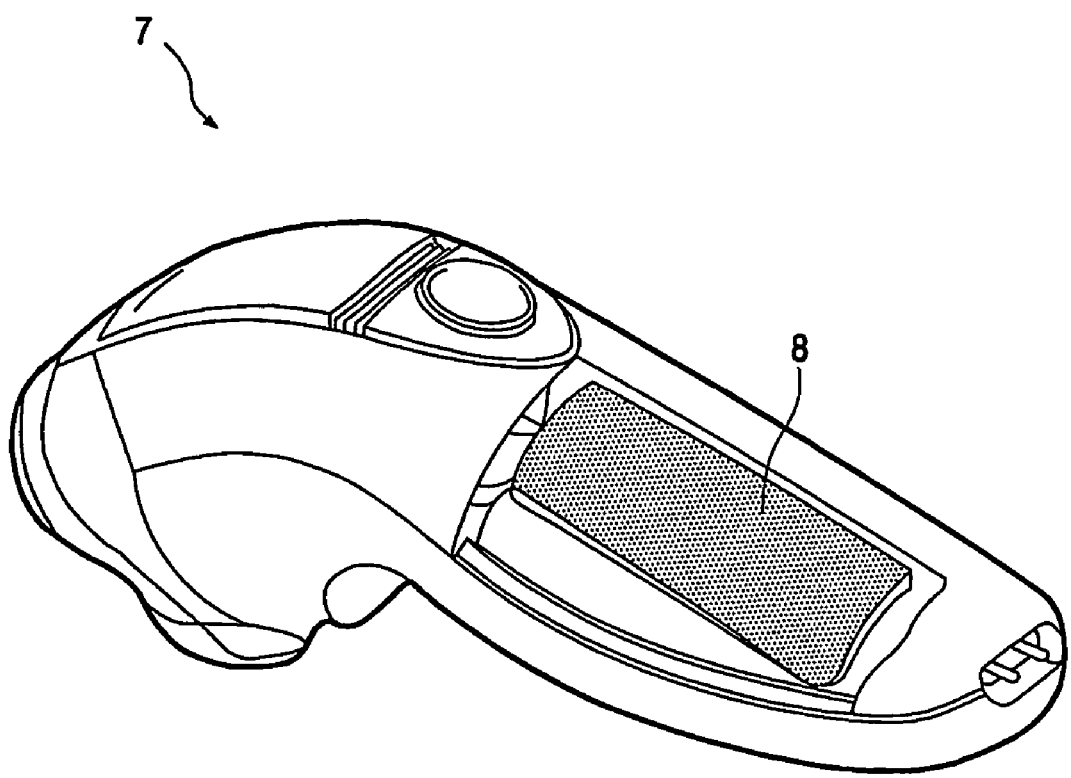
FIG. 3 is a perspective view of a shaver provided with an electrochemical energy source in accordance with the invention.

FIG. 3 is a perspective view of a shaver 7 which is provided with an electrochemical energy source 8 in accordance with the invention. The electrochemical energy source 8 has a curved shape such that it can be optimally accommodated in the housing of the shaver 7. The geometry of the electrochemical energy source 8 may be chosen in conformity with the requirements imposed by an electrical device, for example the shaver 7, in such a manner that the space available in the electrical apparatus can be used to receive the electrochemical energy source 8.

The invention claimed is:

1. Electrochemical energy source, comprising a plurality of fuel cells, wherein each fuel cell comprises:
    a first current collector coupled to a negative electrode,
    a fuel source connected to said negative electrode,
    a second current collector coupled to a positive electrode,
    an oxidant source connected to said positive electrode, and
    an ion-conducting electrolyte located between said negative electrode and said positive electrode, characterized in that the electrochemical energy source has a curved, planar geometry,
    wherein at least one fuel cell is stacked by a polymer material riveted through cavities formed in the positive electrode, the negative electrode, and the electrolyte, and
    wherein the electrochemical energy source comprises a lamination of at least one of said positive electrodes and said negative electrodes, characterized in that the lamination has a curved shape such that the lamination is situated in one curved plane and the resulting electrochemical energy source has a corresponding curved surface.

2. Electrochemical energy source according to claim 1, characterized in that said electrolyte is formed by a Proton Exchange Membrane (PEM).

3. Electrochemical energy source according to claim 1, characterized in that said electrolyte is a liquid-state electrolyte retained in a matrix located between the positive electrode and the negative electrode.

4. Electrochemical energy source according to claim 1, characterized in that the electrochemical energy source comprises at least one assembly of fuel cells electrically coupled together, wherein insulation means are provided for insulating one cell within said assembly from another cell within said assembly.

5. Electrochemical energy source according to claim 1, characterized in that cooling means are provided for cooling said fuel cell.

6. Electrochemical energy source according to claim 1, characterized in that the electrochemical energy source comprises at least one battery electrically coupled to at least one of said fuel cells.

7. Electrochemical energy source according to claim 1, characterized in that the positive electrode and the negative electrode are provided with a catalyst for accelerating electrochemical reaction in said fuel cell.

8. Electronic device incorporating an electrochemical energy source according to claim 1.

9. Electronic device according to claim 8, characterized in that the electronic device comprises a housing incorporating said electrochemical energy source.

* * * * *